United States Patent
Rao et al.

(10) Patent No.: US 6,545,842 B2
(45) Date of Patent: Apr. 8, 2003

(54) DISC DRIVE ACTUATOR ASSEMBLY DRAG REDUCTION FEATURES

(75) Inventors: Ram Mohan Rao, Roseville, MN (US); Adam Karl Himes, Richfield, MN (US); Zine Eddine Boutaghou, Vadnais Height, MN (US); Scott Edward Ryun, Prior Lake, MN (US); Markus Erwin Mangold, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/996,408

(22) Filed: Nov. 28, 2001

(65) Prior Publication Data

US 2002/0097525 A1 Jul. 25, 2002

Related U.S. Application Data

(60) Provisional application No. 60/262,894, filed on Jan. 19, 2001.

(51) Int. Cl.⁷ .......................... G11B 21/16; G11B 33/14
(52) U.S. Cl. .................. 360/244.2; 360/97.02
(58) Field of Search .................. 360/244.2–244.9, 360/235.5–235.9, 254.7, 236.3, 97.02

(56) References Cited

U.S. PATENT DOCUMENTS

| | | | |
|---|---|---|---|
| 4,473,855 A | 9/1984 | Plotto et al. | |
| 4,583,213 A | 4/1986 | Bracken et al. | |
| 4,587,645 A | 5/1986 | Wong et al. | |
| 4,650,138 A | 3/1987 | Grose | |
| 4,660,110 A | 4/1987 | Iida et al. | |
| 4,723,186 A * | 2/1988 | Nakajima et al. | |
| 4,769,727 A * | 9/1988 | Mao | |
| 5,107,626 A | 4/1992 | Mucci | |
| 5,212,679 A | 5/1993 | Tohkairin | |
| 5,386,955 A | 2/1995 | Savill | |
| 5,446,612 A | 8/1995 | Thornton et al. | |
| 5,453,890 A | 9/1995 | Takegami et al. | |
| 5,504,646 A | 4/1996 | Tanaka et al. | |
| 5,566,943 A | 10/1996 | Boehm | |
| 5,854,725 A | 12/1998 | Lee | |
| 5,860,626 A | 1/1999 | Moser | |
| 5,891,551 A | 4/1999 | Gibbs | |
| 5,901,928 A | 5/1999 | Raskob, Jr. | |
| 5,909,339 A | 6/1999 | Hong | |
| 5,933,294 A | 8/1999 | Yanagisawa | |
| 5,973,883 A | 10/1999 | Yanagisawa | |
| 5,999,372 A | 12/1999 | Peterson et al. | |
| 6,097,568 A | 8/2000 | Ekhoff | |
| 6,125,003 A | 9/2000 | Tsuda et al. | |
| 6,193,191 B1 | 1/2001 | Falcimaigne et al. | |
| 6,201,664 B1 * | 3/2001 | Le et al. .................. | 360/244.9 |
| 6,381,101 B1 * | 4/2002 | Mohajerani et al. ..... | 360/254.7 |

* cited by examiner

Primary Examiner—Allen Cao
(74) Attorney, Agent, or Firm—Merchant & Gould P.C.

(57) ABSTRACT

A disc drive has an actuator assembly that includes an actuator arm and a suspension having a load beam for supporting a head above a surface of a disc. The actuator assembly includes a plurality of surface features formed on a surface of at least one of the actuator arm and the load beam to reduce aerodynamic drag forces experienced by the actuator assembly. The disc drive may also include an air dam having a finger extending over the surface of the disc, where the finger includes a plurality of surface features to reduce flow separation of an airflow passing over the finger. The surface features may comprise dimples or V-shaped shark skin denticles.

15 Claims, 4 Drawing Sheets

DISC DRIVE ACTUATOR ASSEMBLY DRAG REDUCTION FEATURES

CROSS REFERENCE TO RELATED APPLICATIONS

This application claims the benefit of U.S. provisional application Ser. No. 60/262,894, filed Jan. 19, 2001, entitled "Drag Reduction Features on Suspension/E-block Assembly to Reduce Airflow Induced Vibration on Suspension Arms."

FIELD OF THE INVENTION

This application relates to magnetic disc drives and more particularly to the incorporation of drag reduction features within the disc drive to reduce vibrations on the actuator assembly and read/write heads caused by air turbulence and drag loads on the actuator assembly.

BACKGROUND OF THE INVENTION

Disc drives are data storage devices that store digital data in magnetic form on a rotating storage medium on a disc. Modern disc drives comprise one or more rigid discs that are coated with a magnetizable medium and are mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

The heads are mounted via flexures or suspensions at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs. Alternatively, linear actuators may be used in place of rotary actuators to move the heads in a linear direction along a radial line of the discs. Regardless of whether a rotary or a linear actuator mechanism is utilized, the heads are typically mounted on a slider (e.g., a ceramic block) having a specially etched air bearing surface that forms an air cushion or "bearing" as the disc rotates beneath the slider. The hydrodynamic lifting force provided by the air bearing surface counters an opposing preload force supplied by the suspension and causes the slider to lift off and "fly" a very small distance above the surface of the disc. Although the fly height of the slider is only a fraction of a micron, this thin film of air between the slider and the disc prevents damage to the fragile magnetic coating on the surface of the disc.

The current generation of disc drives rotates faster and writes data on data tracks that are more closely spaced together than on prior disc drives. Thus, it has become more difficult on these current disc drives to maintain the read/write head centered over a particular disc track as the disc is spinning. Any error in the position of the head relative to the desired track can lead to improper read or write operations and ultimately to data loss.

The ability to maintain the proper head position is made even more difficult by the aerodynamic conditions within the disc drive. As noted above, air within the disc drive is pulled along with the spinning discs to form the cushion or "bearing" that allows the head to fly at a very low altitude over the disc surface. This airflow is often quite turbulent, particularly where the discs rotate at a relatively high rate of speed, and the impact of the turbulent airflow on the actuator arm and suspension causes the suspension (and thus the head) to vibrate in a random manner.

In an effort to reduce the turbulent nature of the airflow within a disc drive, some drive manufacturers have added one or more air dams to the disc drive as shown in U.S. Pat. No. 6,097,568, entitled "Air Dams Positioned Between Spinning Disks for Reducing the Vibration in a Data Storage Device." Such air dams include an arm positioned in the airspace between two adjacent discs to provide an obstruction to the airflow, thereby reducing the energy of the airflow so that the actuator arm/suspension experiences a less turbulent flow. However, it has been found that the presence of such air dams within the enclosed disc drive can often create turbulence as the airflow passes over the air dam. Specifically, as most air dams have a rectangular cross section, it is known that flow separation can occur as the airflow passes over the fingers of the air dam, thereby creating a low pressure area and turbulent eddies immediately downstream of the air dam. These turbulent eddies propagate throughout the drive and ultimately impact the actuator arm/suspension to cause undesired vibrations in the read/write head. Furthermore, it has been observed that the presence of conventional air dams immediately upstream of the actuator assembly can create sufficient additional turbulence that the power requirement of the disc drive (i.e., the power requirement of the spindle motor) is actually increased due to increased "skin friction drag" between the airflow and the surfaces of the disc.

As an alternative to air dams, manufacturers may choose to add structures such as shrouds to closely surround the rotating discs and thereby direct or channel the air within the disc drive in a controlled manner. One such shroud is shown in U.S. Pat. No. 5,696,649, entitled "Elastic Insert Shroud to Provide Maximum Effective Shrouding Shock Mitigation and Filtering in High Speed Disk Drives."

A further alternative is to streamline the leading edge of the actuator arm/suspension to reduce the impact of the turbulent flow on the actuator arm. Such a design is shown in U.S. Pat. No. 5,999,372, entitled "Actuator Arm with Streamlined Leading Edge to Reduce Air Turbulence," which patent is assigned to the assignee of the present application. This patent describes streamlining the leading edges of the actuator arm/suspension as a way to reduce turbulence within the disc drive, thereby reducing the "skin friction drag" on the discs and the power requirement of the spindle motor. That is, this patent describes the creation of a more laminar flow within the disc drive. However, laminar flow is more likely than a turbulent flow to become separated from an object (such as an actuator arm) as the airflow passes over and around the object. Such flow separation leads to relatively high levels of "pressure drag" which is caused by areas of low pressure behind the object, as noted above.

Thus, prior art attempts to reduce airflow induced vibrations on the actuator arm/suspension have concentrated on adding additional structure to reduce the amount of turbulent airflow within the disc drive. However, while the use of air dams, shrouds and tapered actuator arms/suspensions may create a more laminar flow between the discs, relatively large levels of pressure drag may still be experienced by the actuator arms/suspensions as the airflow separates from these structures.

Accordingly, there is a need for reducing the level of airflow induced vibrations experienced by the actuator arm/suspension of a disc drive. The present invention provides a solution to this and other problems, and offers other advantages over the prior art.

SUMMARY OF THE INVENTION

The present invention relates to a disc drive having surface features that reduce the drag forces experienced by the actuator assembly during operation of the disc drive, thereby reducing read/write errors due to drag-induced vibrations on the heads of the disc drive.

In accordance with one embodiment of the present invention, a disc drive includes a disc mounted for rotation on a spindle motor, and an actuator assembly for moving a head above the surface of the disc. The actuator assembly includes an actuator arm and a suspension, wherein the suspension includes a load beam connected at one end to a distal end of the actuator arm and at an opposite end to the head. The actuator assembly includes a plurality of surface features formed on a surface of at least one of the actuator arm and the load beam to reduce an aerodynamic drag force experienced by the actuator assembly.

In one embodiment of the invention, the surface features comprise a plurality of dimples formed in a surface of at least one of the actuator arm and the load beam. Alternatively, the surface features may comprise a plurality of V-shaped denticles formed on a surface of at least one of the actuator arm and the load beam. In another preferred embodiment, the surface features are formed on top and bottom surfaces of the actuator arm, while in other embodiments the surface features are formed on top and bottom surfaces of the load beam. Additionally, in one embodiment of the invention, the surface features are formed on both the actuator arm and the load beam, and the features formed on the load beam are smaller than the features formed on the actuator arm.

In a further embodiment of the invention, the disc drive may include an air dam having a finger extending over the surface of the disc. The finger has a plurality of surface features formed on top and bottom surfaces of the finger to reduce flow separation of an airflow passing over the finger. As with the actuator assembly, the surface features on the finger may comprise a plurality of dimples or a plurality of raised V-shaped features similar to shark skin denticles.

The present invention can also be implemented as an actuator assembly for a disc drive, where the actuator assembly comprises an actuator arm and a suspension which in turn comprises a load beam for supporting a head above a surface of a disc. The actuator assembly includes a plurality of surface features formed on a surface of at least one of the actuator arm aid the load beam to reduce aerodynamic drag forces experienced by the actuator assembly. In one preferred embodiment, the load beam includes a top surface, a bottom surface, and stiffening rails extending upward from the top surface along opposite sides of the load beam, and the surface features are formed on top and bottom surfaces of the actuator arm and on the bottom surface of the load beam.

The present invention can further be implemented as a disc drive assembly having a disc mounted for rotation on a spindle motor, and an actuator assembly extending within a flow of air created by the rotating disc. The actuator assembly includes an actuator arm and a suspension for positioning a head above the disc surface. The disc drive assembly further includes means for reducing aerodynamic drag on the actuator assembly to reduce drag-induced vibrations on the head. In one preferred embodiment, the means for reducing aerodynamic drag on the actuator assembly includes a plurality of surface features formed on at least one of the actuator arm and the suspension. In a further preferred embodiment, the means for reducing aerodynamic drag on the actuator assembly includes an air dam having a plurality of surface features to reduce flow separation of an airflow passing over the air dam.

These and various other features as well as advantages which characterize the present invention will be apparent from a reading of the following detailed description and a review of the associated drawings.

DETAILED DESCRIPTION

Figure 1:
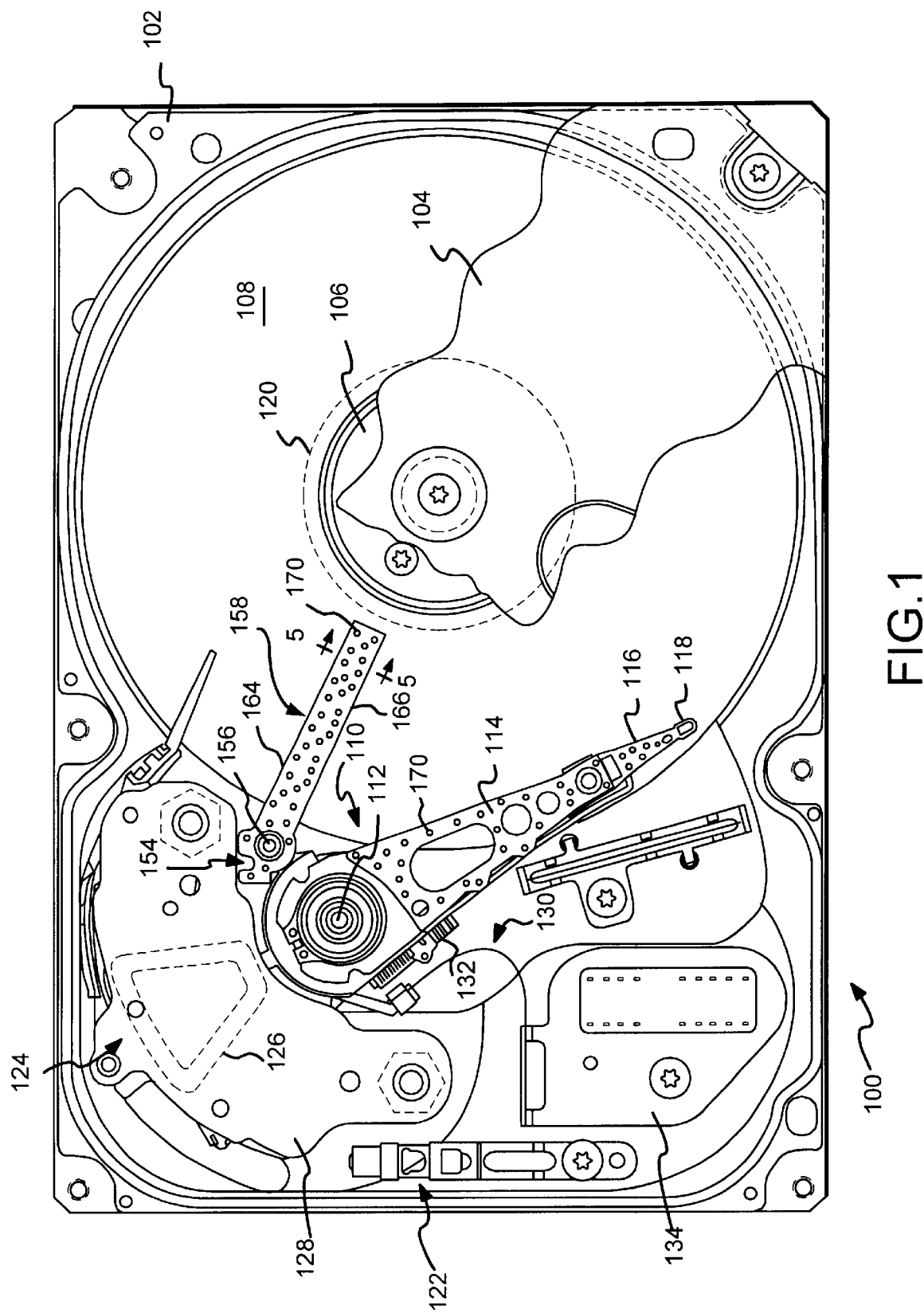
FIG. 1 is a top plan view of a disc drive assembly in accordance with a preferred embodiment of the present invention, with a top cover of the disc drive assembly partially broken away.

A disc drive 100 constructed in accordance with a preferred embodiment of the present invention is shown in FIG. 1. The disc drive 100 includes a base plate 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each distal end of the actuator arms 114. Mounted at the distal end of each of the flexures 116 is a head 118 which includes an air bearing slider enabling the head 118 to fly in close proximity above the corresponding surface of the associated disc 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement 122, which prevents inadvertent rotation of the actuator arms 114 when the heads are parked. Alternatively, in the case of a Load/Unload disc drive, the heads 118 may be secured within the grooves of a loading ramp (not shown) when the motor is de-energized.

The radial position of the heads 118 is controlled through the use of a voice coil motor 124, which typically includes a coil 126 attached to the actuator assembly 110, as well as one or more permanent magnets and return plates 128 which are spaced apart to establish a vertical magnetic field within which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base plate 102 to a disc drive printed circuit board assembly (not shown) mounted to the bottom side of the disc drive base plate 102.

Figure 2:
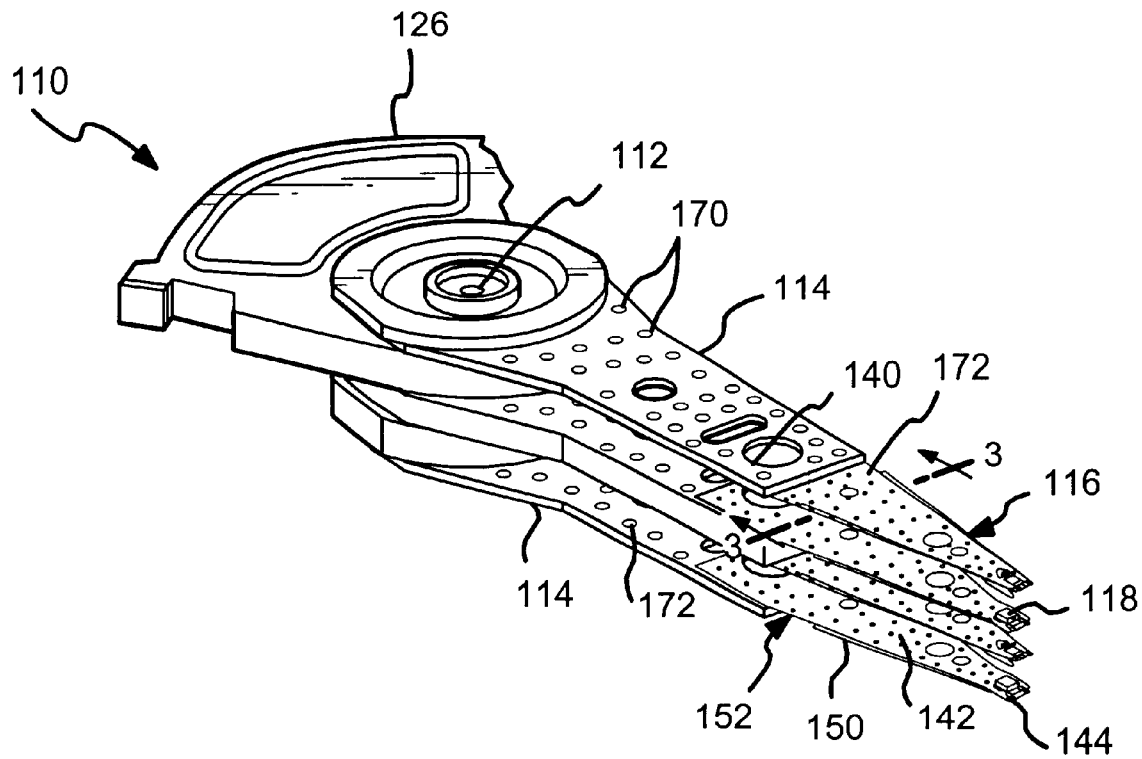
FIG. 2 is a perspective view of an actuator assembly of the disc drive assembly of FIG. 1 illustrating one preferred embodiment of a surface feature applied to the actuator arms and suspensions of the actuator assembly in accordance with the present invention.

Referring now to FIG. 2, a perspective view of the actuator assembly 110 is shown. The particular actuator assembly 110 shown in FIG. 2 includes three actuator arms 114 and four flexures 116 adapted to engage the top and bottom surfaces of two parallel discs 108 (FIG. 1). Specifically, the top and bottom flexures 116 are attached to the respective top and bottom actuator arms 114 and are positioned to engage a top surface of a top disc and a bottom surface of a bottom disc 108, respectively. The middle two flexures 116 are attached to both the top and bottom surfaces of the middle actuator arm 114 to engage a bottom surface of the top disc and a top surface of the bottom disc, respectively. While four flexures 116 are shown in FIG. 2, it is understood that the present invention may be utilized with a different number of discs 108 requiring either a larger or smaller number of flexures 116. Similarly, while a rotary actuator assembly 110 is shown in FIGS. 1 and 2, the present invention may be utilized with a linear actuator (not shown) since the actuator arms 114 and the suspensions 116 of a linear actuator would experience airflow conditions similar to that experienced by a rotary actuator.

The actuator arms 114 extend forward in parallel fashion from the bearing shaft assembly 112. Each actuator arm 114 has a substantially rectangular cross-section, and the middle arm 114 has a slightly greater thickness than the top and bottom actuator arms 114 to allow the middle arm to secure two flexures 116 as opposed to the single flexure 116 attached to each of the top and bottom actuator arms 114.

A distal end of each actuator arm 114 includes a staking hole 140 for securing a proximal end of the flexure 116 using a conventional staking or swaging process. The flexure 116 comprises a load beam 142 and a gimbal 144 attached to a distal end of the load beam. The head 118 is attached to the gimbal to allow for limited pivoting movement of the head 118 relative to the distal end of the load beam 142 during operation of the disc drive 100.

Figure 3:
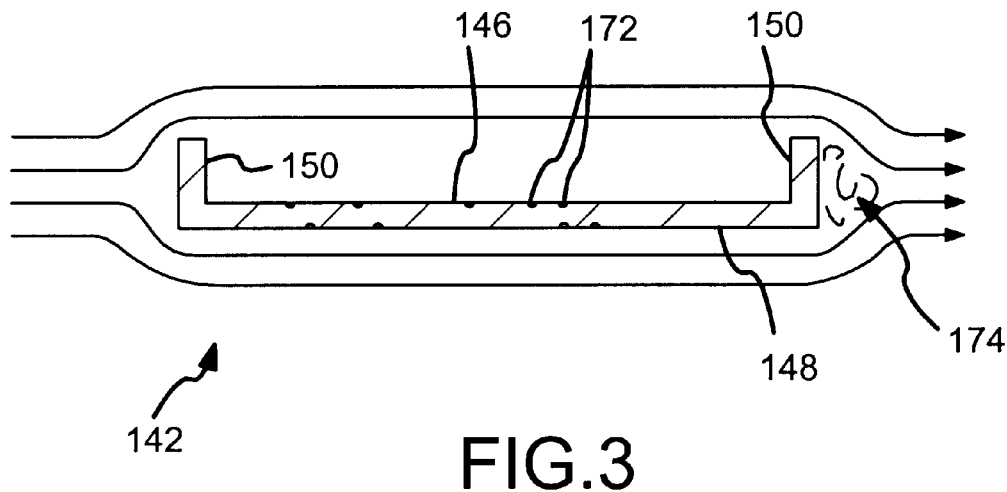
FIG. 3 is an enlarged cross-sectional view through a load beam of the suspension taken substantially along the line 3—3 in FIG. 2.

Each load beam 142 comprises a metal sheet having a nominal thickness of approximately two thousandths of an inch and includes a top surface 146, a bottom surface 148, and vertical stiffening rails 150 that extend along opposite side edges of the load beam 142. The stiffening rails 150 extend along substantially the entire length of the load beam 142 except for a bend region 152 adjacent the distal end of the actuator arm 114 The bend region 152 is without stiffening rails 150 so that the region 152 may be bent in the direction of the corresponding disc surface to apply a preload force to the head 118. The stiffening rails 150 extend from the bend region 152 to the distal end of the load beam 142 where the gimbal 144 is attached (although in some embodiments the gimbal 144 may be formed integrally with the load beam 142). In this manner, a cross-section of the load beam portion 142 of the suspension 116 forms a substantially U-shaped channel as shown in FIG. 3. Of course, it is possible to form a suspension without stiffening rails 150, and the present invention encompasses such alternative suspensions as described below.

As noted above, the airflow within a disc drive 100 is frequently turbulent in nature due to the high speed at which the discs 108 rotate. Such turbulent flow may degrade the performance of the disc drive 100 by increasing the drag force on the discs 108 (i.e., the "skin friction drag") and by impacting the actuator arm 114 and the suspension 116, thereby causing the head 118 to vibrate in a random and unpredictable manner. To address the issue of turbulent flow, disc manufacturers have added features within the disc drive to smooth the flow of air adjacent the surfaces of the discs 108. One of these features is an air dam 154 (FIG. 1) which is used to place an obstruction within the airflow to remove energy from the airflow, thereby creating a less turbulent flow within the disc drive 100.

The air dam 154 includes a vertical shaft 156 and a plurality of fingers 158 extending radially inward along the disc surfaces. The vertical shaft 156 of the air dam 154 is preferably placed upstream of the actuator assembly 110 (relative to the direction of the airflow within the disc drive 100) as shown in FIG. 1 to provide maximum air-smoothing benefit to the actuator arms 114 and suspensions 116. Alternatively, multiple air dams 154 may be utilized to smooth the air over substantially the entire circumference of the discs 108. The fingers 158 (FIG. 4) are sized to fit between adjacent discs 108 while leaving a slight airspace between the finger and the adjacent disc surface. Each finger 158 includes a top surface 160, a bottom surface 162, a leading edge 164, and a trailing edge 166 so that each finger 158 defines a substantially rectangular cross-section as shown in FIG. 5.

While the air dam 154 may be used to provide a relatively laminar airflow to the actuator assembly 110, it is known that flow over a flat plate or other non-aerodynamic structure may become separated from the structure thereby forming an area of low pressure immediately downstream of the structure. This area of low pressure results in a phenomenon known as "pressure drag" due to the tendency of the low pressure area to pull the structure in the downstream direction.

Figure 4:
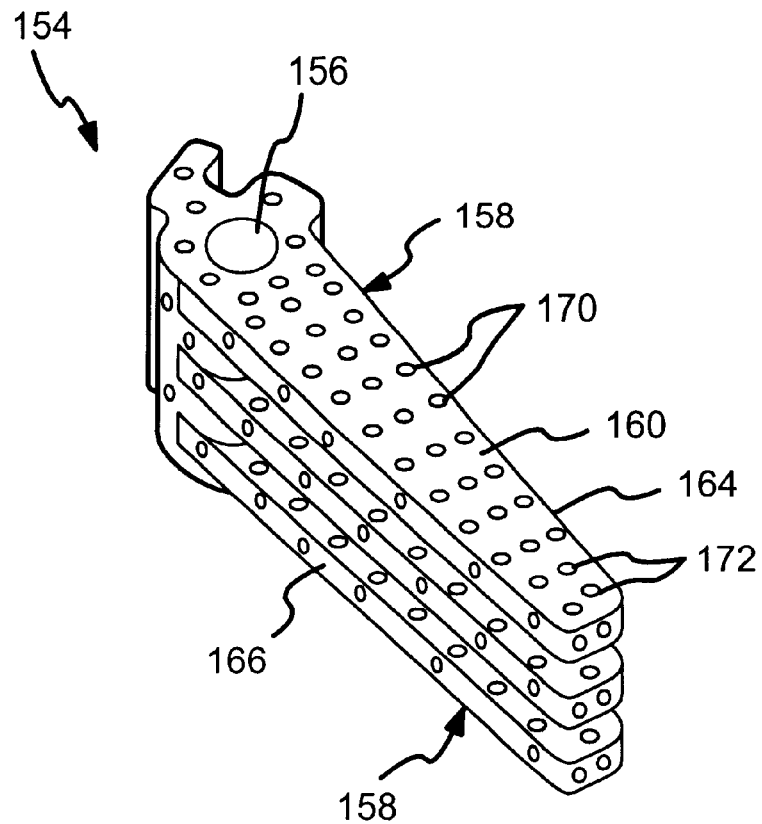
FIG. 4 is a perspective view of an air dam of the disc drive assembly of FIG. 1 illustrating one preferred embodiment of a surface feature applied to the air dam in accordance with the present invention.
Figure 5:
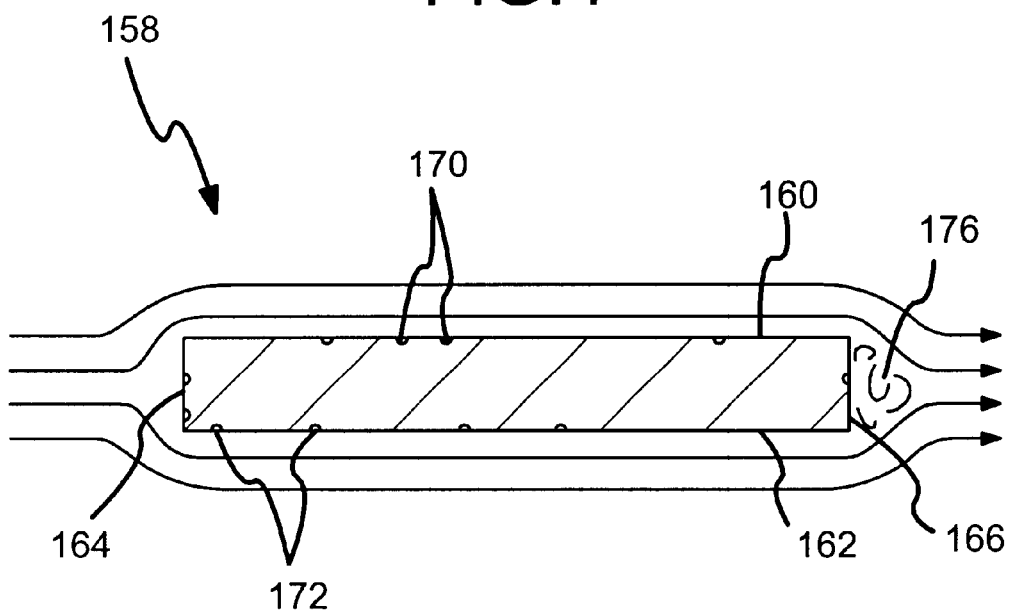
FIG. 5 is an enlarged cross-sectional view through the air dam taken substantially along the line 5—5 in FIG. 1.

The present invention addresses the issue of high levels of pressure drag on the actuator assembly 110 by adding surface features 170 to the actuator arms 114 and/or the suspensions 116 as shown in FIGS. 1, 2 and 4. These surface features 170 act to roughen the wetted surfaces of the actuator assembly 110 (i.e., those surfaces exposed to the airflow) and thereby trip the airflow from laminar to turbulent flow. Specifically, the roughened surface features 170 affect the airflow only in the relatively small boundary layer immediately adjacent the wetted surfaces of the actuator assembly 110. By energizing or stabilizing the boundary layer, the surface features 170 help to maintain the boundary layer attached to the corresponding portion of the actuator assembly 110, thereby reducing the level of pressure drag experienced by the actuator assembly 110.

In a preferred embodiment shown in FIGS. 1 and 3, the roughened surface features 170 comprise dimples 172 that are formed or etched in the top and bottom surfaces of the actuator arm 114 and the suspension 116. These dimples 172 act in the above described manner to trip the laminar boundary layer flow to a turbulent flow. As noted above, a turbulent boundary layer is more energetic than a laminar boundary layer and is thus more likely to remain attached to the structure it is passing over (i.e., the wetted surfaces of the actuator arm 114 and the suspension 116). This phenomenon is shown in FIG. 3 where the airflow passing over the load beam 142 of one of the suspension members 116 remains substantially attached so that only a relatively small area 174 of low pressure is formed downstream of the load beam 172. It should be noted that FIG. 3 only illustrates the portion of the free stream that is normal to the cross section of the load beam 142. The free stream will typically include a component that runs longitudinally along the load beam 142 (i.e., between the rails 150 forming the U-shaped channel in FIG. 3).

FIG. 3 thus differs from prior art load beams 142 where the flow would become detached closer to an upstream edge of the load beam 142, resulting in a much larger low pressure area 174. Thus, the actuator assembly 110 of the present invention operates to reduce the "pressure drag" experienced by the suspension 116 (and specifically the load beam 142). On the other hand, a turbulent boundary layer will tend to increase the level of skin friction drag experienced by the suspension 116 as is well known to those skilled in the aerodynamic arts. However, in the airflow regime of the disc drive 100 (where the Reynolds number is relatively low), it is known that pressure drag represents a higher proportion of the overall drag than skin friction drag. Thus, while the present invention lowers pressure drag at a cost of increasing skin friction drag, the dimples 172 serve to reduce the overall drag experienced by the suspension 116.

A similar result is found with the actuator arm 114 (FIGS. 1 and 2) where the dimples 172 are applied to both a top and bottom surface of each arm 114. Indeed, since the actuator arm 114 has a rectangular cross-sectional shape, the dimples 172 will be even more effective at keeping the airflow attached to the arm 114 than with the U-shaped cross-section of the load beam 142.

In the case of both the actuator arm 114 and the suspension 116, the dimples 172 may be pressed or etched into the respective top and bottom surfaces of these structures. Additionally, dimples 172 of the same size may be used for both the actuator arm 114 and the suspension 116 (as shown in FIG. 1) or, alternatively, the thinner and more delicate suspension 116 may include smaller dimples 172 as shown in FIG. 2. In this manner, the dimples 172 on the load beam 142 may be formed in a different manner (e.g., etching) than the dimples 172 formed on the actuator arm 114 (e.g., pressing). Furthermore, the dimples 172 may be optimized for a particular aerodynamic environment within different disc drives. That is, both the shape and the size or radius of the dimples 172 may be optimized for different actuator arms 114 and different suspensions 116.

Turning to FIG. 4, the present invention also encompasses the use of surface roughening features 170 on the wetted portions of an air dam 154 when an air dam is included with the disc drive 100. As noted above, air dams may be used to smooth the turbulent airflow within a disc drive by providing a barrier that absorbs energy from the airflow. The resulting de-energized airflow is predominantly laminar in nature and it is this laminar airflow that impacts the actuator assembly 110 as described above. However, as noted above, it has been observed that positioning air dams immediately upstream of the actuator assembly 110 may have a detrimental effect on the power requirement of a disc drive. Furthermore, while the air dam 154 is effective at smoothing large portions of the turbulent airflow, the individual fingers 158 of the air dam are susceptible to flow separation just as described above with respect to the different elements of the actuator assembly 110. That is, flow passing over the rectangular cross-section of each air dam finger 158 is likely to separate prior to reaching the trailing edge 166 of the finger 158. Such separated flow can cause a relatively large area of low pressure behind the trailing edge 166 of the fingers 158. This area of low pressure creates turbulent eddies behind the air dam 154 that may migrate downstream to the actuator assembly 110 and cause undesirable vibrations in the suspension 116 and ultimately in the head 118.

The present invention may be beneficially utilized in conjunction with the fingers 158 of the air dam 154 (as shown in FIGS. 4 and 5) to maintain the airflow attached to the fingers 158, thereby reducing the size of a downstream area 176 of low pressure. Thus, the surface features 170 (and specifically the dimples 172 shown in FIG. 4) act to trip the boundary layer to turbulent flow adjacent the wetted surfaces of the air dam fingers 158. In preferred embodiments, the wetted surfaces include not only the top and bottom surfaces 160 and 162, respectively, but also the leading edge 164. In some embodiments, the trailing surface 166 may also be included as a wetted surface. Thus, for purposes of illustration in FIGS. 4 and 5, the dimples 172 are preferably formed on each of the surfaces 160, 162, 164 and 166 to help ensure that the flow remains attached as shown in FIG. 5. However, it is understood that the present invention encompasses the formation of the dimples 172 on fewer than all fours surfaces 160, 162, 164 and 166. The air dam 154 of the present invention thus represents an improvement over prior art air dams by directing a smoother airflow to the actuator assembly 110 that is free of much of the turbulence that is generated when the airflow separates from prior art air dams.

Figure 6:
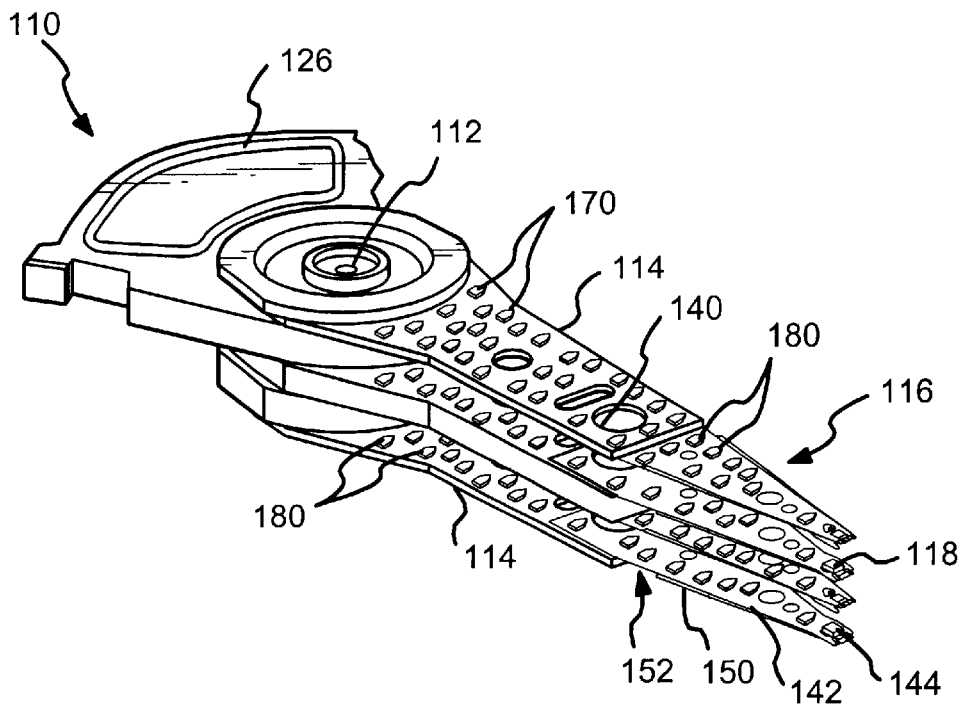
FIG. 6 is a perspective view of an actuator assembly similar to FIG. 2 illustrating an alternative embodiment of a surface feature applied to the actuator arms and suspensions of the actuator assembly in accordance with the present invention.
Figure 7:
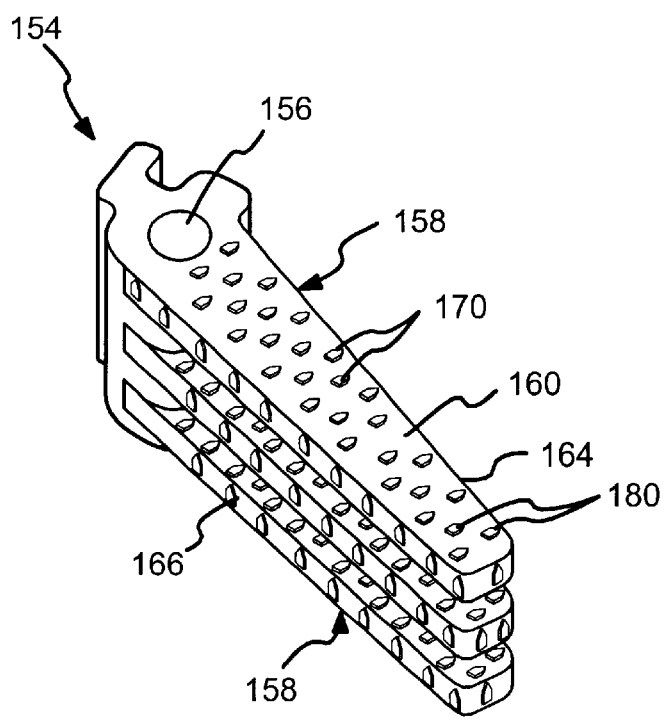
FIG. 7 is a perspective view of an air dam similar to FIG. 4 illustrating an alternative embodiment of a surface feature applied to the air dam in accordance with the present invention.

While the preferred embodiment of the surface features 170 is shown as dimples 172 in FIGS. 1–5, the present invention encompasses other types of surface features 170, including features 180 similar to shark skin "denticles" as shown in FIGS. 6 and 7. The features 180 comprise V-shaped ridges or denticles that form small streamwise vortices in the airflow. These vortices help to energize the boundary layer flow, thereby maintaining the airflow attached to the corresponding surface such as the actuator arm 114. Additionally, the vortices generate low pressure centers at their core which helps to maintain the boundary layer attached to the surface. The use of features similar to shark skin denticles (such as shown in FIGS. 6 and 7) is well known to those skilled in the field of aerodynamics, and the denticles 180 act in a similar manner to the dimples 172 to stabilize the boundary layer flow and prevent flow separation. The choice of a particular surface feature 170 may depend on the airflow characteristics within the disc drive (e.g., the Reynolds number of the airflow). Indeed, the present invention encompasses other types of surface features 170 that may be well known to those skilled in the art, provided that the features are adapted to stabilize the airflow over the actuator assembly 110 and thereby reduce pressure drag as described above.

Due to the varying nature of the airflow within the disc drive (particularly due to the rotary nature of the actuator assembly 110), the dimples 172 are presently preferred over the use of the V-shaped denticles 180 with respect to actuator arms 114 and suspensions 116 since the denticles 180 are most effective when their vertex (i.e., the tip of the V-shape) points directly into the free stream. That is, the dimples 172 represent a more "non-directional" drag reduction feature than the denticles 180 and thus are presently preferred for use on the moving actuator assembly 110. However, the denticles 180 may be more effectively utilized on the air dam 154 since the air dam does not rotate during operation of the disc drive 100 and thus the denticles 180 may be precisely positioned with respect to the free stream flow within the disc drive.

While the use of the drag-reducing surface features 170 is described above with respect to both the actuator assembly 110 and the air dam 154, it is understood that the present invention encompasses the use of such features on one or the other of these structures as well as on both the actuator assembly 110 and the air dam 154 as shown in the drawing. Additionally, the present invention encompasses the use of the surface features 170 on just a portion of the actuator assembly 110 as well as on both the actuator arm 114 and the suspension 116. For example, due to the relative ease of forming the surface features 170 on the actuator arm 114 (i.e., due to the greater thickness of the arm 114 relative to the load beam 142), and further due to the larger size of the actuator arm compared to the suspension 116, a beneficial reduction in overall pressure drag may be achieved by adding the surface features to only the actuator arm 114. Alternatively, because the actuator arm 114 is much stiffer than the suspension 116, and thus the suspension 116 is more susceptible to vibrations induced by turbulent airflow, a beneficial reduction in suspension vibration may be achieved by adding the surface features 170 to only the suspension 116 (e.g., to just the load beam 142). Furthermore, because the stiffening rails 150 on the load beam 142 tend to reduce the effectiveness of the surface features located on the top surface 146 of the load beam, the present invention encompasses the application of the surface features 170 to only the bottom surface 148 of the load beam 142. Alternatively, in those instances where the load beam 142 does not include stiffening rails 150, the surface features 170 are preferably applied to both surfaces of the load beam 142.

The use of the surface features 170 represents an improvement over prior art structures such as air shrouds which increase the cost and complexity of the disc drive 100 while failing to address the problem of flow separation and relatively high levels of pressure drag on the actuator assembly 110. Indeed, the present invention achieves a reduction in the levels of air-induced vibration without adding any components or assembly steps to the disc drive 100. The surface features 170 are added to the relevant components such as the actuator arms 114 and the load beams 142 prior to assembly of the actuator assembly 110. If the disc drive design calls for the use of an air dam 154, then the surface features 170 are applied to the fingers 158 prior to the assembly of the air dam 154 within the disc drive 100. Thus, the surface features 170 represent a cost-effective means for improving the performance of the disc drive 100 without adding any new components to the drive assembly. Furthermore, application of the surface features 170 requires no major structural changes to the relevant disc drive components. This represents an improvement over prior art solutions that alter the actuator assembly components (e.g., the actuator arms) to streamline the leading edges of those components.

In summary, a disc drive (such as 100) in accordance with an exemplary preferred embodiment of the present invention has a disc (such as 108) mounted for rotation on a spindle motor (such as 106) and an actuator assembly (such as 110) for moving a head (such as 118) above the surface of the disc (such as 108). The disc drive actuator assembly (such as 110) includes an actuator arm (such as 114) and a suspension (such as 116), wherein the suspension includes a load beam (such as 142) connected at one end to a distal end of the actuator arm (such as 114) and at an opposite end to the head (such as 118). The suspension (such as 116) includes a plurality of surface features (such as 170) formed on a surface of at least one of the actuator arm (such as 114) and the load beam (such as 142) to reduce an aerodynamic drag force experienced by the actuator assembly (such as 110).

In preferred embodiments of the invention, the surface features (such as 170) comprise a plurality of dimples (such as 172) formed in a surface of at least one of the actuator arm (such as 114) and the load beam (such as 142). Alternatively, the surface features (such as 170) may comprise a plurality of V-shaped denticles (such as 180) formed on a surface of at least one of the actuator arm (such as 114) and the load beam (such as 142).

In further preferred embodiments of the invention, the surface features (such as 170) are formed on top and bottom surfaces of the actuator arm (such as 114), while in other embodiments the surface features (such as 170) are formed on a top surface (such as 146) and a bottom surface (such as 148) of the load beam (such as 142). Additionally, in one embodiment of the invention, the surface features (such as 170) are formed on both the actuator arm (such as 114) and the load beam (such as 142), and the features formed on the load beam (such as 142) are smaller than the features (such as 170) formed on the actuator arm (such as 114).

Furthermore, the disc drive (such as 100) may include an air dam (such as 154) having a finger (such as 158) extending over the surface of the disc (such as 108). The finger (such as 158) has a plurality of surface features (such as 170) formed on a top surface (such as 160) and a bottom surface (such as 162) of the finger to reduce flow separation of an airflow passing over the finger (such as 158). In one preferred embodiment, the surface features (such as 170) on the finger (such as 158) comprise a plurality of dimples (such as 172), while in another preferred embodiment the surface features (such as 170) comprise a plurality of V-shaped denticles (such as 180).

In another exemplary preferred embodiment of the present invention, an actuator assembly (such as 110) for a disc drive (such as 100) comprises an actuator arm (such as 114) and a suspension (such as 116) which in turn comprises a load beam (such as 142) for supporting a bead (such as 118) above a surface of a disc (such as 108). The suspension (such as 116) includes a plurality of surface features (such as 170) formed on a surface of at least one of the actuator arm (such as 114) and the load beam (such as 142) to reduce aerodynamic drag forces experienced by the actuator assembly (such as 110). In one preferred embodiment of the invention, the load beam (such as 142) includes a top surface (such as 146), a bottom surface (such as 148), and stiffening rails (such as 150) extending upward from the top surface (such as 146) along opposite sides of the load beam (such as 142), and the surface features (such as 170) are formed on top and bottom surfaces of the actuator arm (such as 114) and on the bottom surface (such as 148) of the load beam (such as 142).

In yet a further exemplary preferred embodiment of the present invention, a disc drive assembly (such as 100) has a disc (such as 108) mounted for rotation on a spindle motor (such as 106) and an actuator assembly (such as 110) extending within a flow of air created by the rotating disc (such as 108). The actuator assembly (such as 110) includes an actuator arm (such as 114) and a suspension (such as 116) for positioning a head (such as 118) above the disc surface. The disc drive assembly (such as 110) further includes means (such as 170) for reducing aerodynamic drag on the actuator assembly (such as 110) to reduce drag-induced vibrations on the head (such as 118). In one preferred embodiment, the means (such as 170) for reducing aerodynamic drag on the actuator assembly (such as 110) includes a plurality of surface features (such as 172 and 180) formed on at least one of the actuator arm (such as 114) and the suspension (such as 116). In a further preferred embodiment, the means (such as 170) for reducing aerodynamic drag on the actuator assembly (such as 110) includes an air dam (such as 154) having a plurality of surface features (such as 172 and 180) to reduce flow separation of an airflow passing over the air dam (such as 154).

Thus, the present invention encompasses the inclusion of the surface features 170 on either the components of the actuator assembly 110 (e.g., one or both of the actuator arm 114 and the suspension 116) or on the fingers 158 of an air dam 154 to reduce the effect of turbulent air on the heads 118 of the disc drive 100. In one preferred embodiment shown in FIG. 1, the surface features 170 are located on both the air dam 154 and the actuator assembly 110. Additionally, the precise shape of the surface features may be chosen to provide an optimal reduction in the pressure drag experienced by the actuator assembly 110. While both dimples 172 and shark skin denticles 180 are described above, alternative surface features may be selected by those skilled in the art depending on the particular flow characteristics (e.g., Reynolds number) of the airflow found in the disc drive 100.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art. For example, while two types of surface features 170 are described and shown in the drawing (e.g., dimples 172 and shark-like denticles 180), it is understood that alternative surface features 170 known to those skilled in the art may be utilized. Additionally, while pressing (stamping) and etching processes are described above for forming the surface features 170 on the actuator assembly 110 and the air dam fingers 158, alternative methods may be used to create the surface features 170 on the appropriate surfaces. Accordingly, all such modifications, changes and alternatives are encompassed in the spirit of the invention disclosed and as defined in the appended claims.

What is claimed is:

1. A disc drive assembly having a disc mounted for rotation on a spindle motor, the disc having a surface for recording data, the disc drive assembly further including an actuator assembly for moving a head above the disc surface, and wherein the actuator assembly comprises:

an actuator arm;

a suspension comprising a load beam having a first end connected to a distal end of the actuator arm, the load beam having a second end for supporting the head; and wherein the actuator assembly includes a plurality of surface features formed on a surface of at least one of the actuator arm and the load beam without penetrating the surface to reduce an aerodynamic drag force experienced by the actuator assembly, the surface features selected from a group consisting of dimples and V-shaped denticles.

2. The disc drive assembly of claim 1 wherein the surface features are formed on top and bottom surfaces of the actuator arm.

3. The disc drive assembly of claim 1 wherein:

the load beam includes a top surface, a bottom surface, and stiffening rails extending upward from the top surface along opposite sides of the load beam; and the surface features are formed on the bottom surface of the load beam.

4. The disc drive assembly of claim 3 wherein additional surface features are further formed on the top surface of the load beam.

5. The disc drive assembly of claim 1 wherein:

the load beam includes a top surface, a bottom surface, and stiffening rails extending upward from the top surface along opposite sides of the load beam; and the surface features are formed on top and bottom surfaces of the actuator arm and on the bottom surface of the load beam.

6. The disc drive assembly of claim 5 wherein additional surface features are further formed on the top surface of the load beam.

7. The disc drive assembly of claim 5 wherein the surface features formed on the load beam are smaller than the surface features formed on the actuator arm.

8. A disc drive assembly having a disc mounted for rotation on a spindle motor, the disc having a surface for recording data, the disc drive assembly further including an actuator assembly for moving a head above the disc surface, and wherein the actuator assembly comprises:

an actuator arm;

a suspension comprising a load beam having a first end connected to a distal end of the actuator arm, the load beam having a second end for supporting the head;

wherein the actuator assembly includes a plurality of surface features formed on a surface of at least one of the actuator arm and the load beam to reduce an aerodynamic drag force experienced by the actuator assembly; and an air dam having a finger extending over the disc surface, the air dam positioned upstream of the actuator assembly relative to the flow of air over the disc surface, and the finger having a plurality of air dam surface features formed on top and bottom surfaces of the finger to reduce flow separation of the airflow passing over the finger.

9. The disc drive assembly of claim 8 wherein the air dam surface features comprise a plurality of dimples formed in the top and bottom surfaces of the finger.

10. The disc drive assembly of claim 8 wherein the air dam surface features comprise a plurality of V-shaped denticles formed on the top and bottom surfaces of the finger.

11. An actuator assembly for a disc drive having a disc mounted for rotation on a spindle motor, the actuator assembly comprising:

an actuator arm;

a suspension comprising a load beam having a first end connected to a distal end of the actuator arm, the load beam having a second end for supporting a head above a surface of the disc; and wherein the actuator assembly includes a plurality of surface features formed on a surface of at least one of the actuator arm and the load beam without penetrating the surface to reduce an aerodynamic drag force experienced by the actuator assembly, the surface features selected from a group consisting of dimples and V-shaped denticles.

12. The actuator assembly of claim 11 wherein:

the load beam includes a top surface, a bottom surface, and stiffening rails extending upward from the top surface along opposite sides of the load beam; and the surface features are formed on top and bottom surfaces of the actuator arm and on the bottom surface of the load beam.

13. The actuator assembly of claim 12 wherein the surface features formed on the load beam are smaller than the surface features formed on the actuator arm.

14. A disc drive assembly having a disc mounted for rotation on a spindle motor, the disc having a surface for recording data, the disc drive assembly further comprising:

an actuator assembly extending within a flow of air created by the rotating disc, the actuator assembly including an actuator arm and a suspension for positioning a head above the disc surface; and means for reducing aerodynamic drag on the actuator assembly to reduce drag-induced vibrations on the head, the means including an air dam having a plurality of surface features to reduce flow separation of an airflow passing over the air dam.

15. The disc drive assembly of claim 14 wherein the means for reducing aerodynamic drag on the actuator assembly includes a plurality of surface features formed on a surface of at least one of the actuator arm and the suspension without penetrating the surface.

* * * * *